Patented June 17, 1930

1,764,516

UNITED STATES PATENT OFFICE

FRANK S. LOW, OF NIAGARA FALLS, NEW YORK ASSIGNOR, BY MESNE ASSIGNMENTS, TO THE SAID FRANK S. LOW, AND A. W. BERRESFORD, OF DETROIT, MICHIGAN

TANNING COMPOSITION AND METHOD OF PRODUCING SAME, ETC.

No Drawing. Application filed August 9, 1928. Serial No. 298,627.

This invention relates to improvements in tanning and includes a new tanning composition, together with improvements in methods of producing the same and of preparing a tanning liquor and of tanning therewith.

The new tanning composition of the present invention is a hydrated or basic chromium chloride prepared in the form of a dry or sintered cake or reaction product, and which is soluble in water and can be employed for the preparation of tanning baths. The new tanning composition is a reaction product directly prepared in the presence of a limited amount of water which is retained either completely or largely as water of hydration in the hydrated or basic chromium chloride product. The composition varies with the method of production and the ingredients from which it is produced, and compositions having somewhat different properties can be produced, as hereinafter more fully pointed out.

In forming the new composition, hydrated or basic chromic chloride is produced by reaction from chromium chloride in the presence of a limited amount of water which will largely or entirely be combined as water of combination or hydration in the basic chromium chloride product, so that the product is directly produced in a solid and water soluble state.

Anhydrous chromic chloride can readily be produced in an insoluble form by the chlorination of ferrochrome at a high temperature and the separation of the resulting ferric chloride by volatilization leaving the chromic chloride in the form of a purple or violet crystalline mass which is insoluble in water and is readily stored, shipped and handled. While anhydrous chromic chloride is not soluble in water, it readily becomes soluble and dissolved in water in the presence of a small amount of a reducing agent. When anhydrous chromic chloride is employed in making the new tanning composition, it is employed together with a reducing agent which will render it water soluble and cause it to react to form the basic chromic chloride. When metals such as zinc or aluminum or ferrochrome are employed as reducing agents for the anhydrous chromic chloride, they combine with part of the chlorine originally present in the chromic chloride, while the chromous chloride produced by the reduction rapidly oxidizes to form a basic chloride or oxy-chloride. By employing a sufficient amount of the metals as reducing agents together with water to bring about the reaction, there can be directly produced a reaction product in the form of a basic chromium chloride which contains water, all or most of which is combined therewith as water of combination or hydration.

The invention will be further illustrated by the following specific example in which powdered ferrochrome is employed with anhydrous chromic chloride as the reducing agent, but with a use of a sufficient amount of ferrochrome to serve not only as reducing agent but also to reduce a sufficient amount of the chromic chloride, or to combine with a sufficient proportion of the chlorine of the chromic chloride so that basic chromic chloride will be produced.

Anhydrous chromic chloride and ferrochrome, both in the form of powder, are mixed in the proportions of about 6 parts of anhydrous chromic chloride to 1 part of ferrochrome and a limited amount of boiling water is added to convert the powder into a dough or paste. A violent reaction takes place with the formation of a greenish-gray clinker-like or sintered material. By limiting the amount of water present, but nevertheless adding sufficient water to bring about the reaction, the water can be largely combined in the resulting basic chromium chloride as water of combination or hydration, so that a dry or relatively dry product can be directly produced, although if it contains an excess of water it may be subjected to a further drying.

The cake or reaction product produced as as above described can be cast in molds, e. g. containing about 10 pounds of the mix, and employed in that form for adding to the tanning bath; or the reaction product can be powdered and shipped and stored in powdered form. The product is readily soluble in water and can be added to the tanning bath in predetermined amounts.

In the preceding example, the reducing agent in excess is relied upon to take care of part of the chlorine of the anhydrous chromic chloride so that a basic chloride will be produced. It is more advantageous to employ an added base for taking care of part of the chlorine of the chromic chloride, in which case the chloride of the base employed will be present in the reaction product. When an added base is employed with anhydrous chromic chloride, a reducing agent is also employed, together with a limited and regulated amount of water such that the water will be largely or entirely confined in the reaction product as water of combination or hydration.

Among the bases which may be employed with the anhydrous chromic chloride and a reducing agent may be mentioned magnesium oxide and carbonate, calcium oxide and carbonate, chromium hydrate or hydroxide, sodium carbonate, etc. Sodium carbonate is particularly advantageous. The proportion of base employed can be varied, and the basicity of the resulting basic chromium chloride can thereby be regulated. Considering pure chromic chloride to be 100% acidic and pure chromic hydroxide to be 100% basic, a basic chromic chloride can be produced having a range of basicity, for example, between 30% and 60% basic, by adding sufficient sodium carbonate to combine with the proper proportion of the chlorine of the chromic chloride employed. For example, if enough sodium carbonate is added to combine with 60% of the chlorine initially present in the chromic chloride, a compound of about 60% basicity would be produced.

The amount of reducing agent required with anhydrous chromic chloride to render it soluble is very small, being only around 1% or so. Among the reducing agents which can be employed may be mentioned aluminum, zinc and ferrochrome. These are best used in a finely divided state.

In producing the new composition, when an added base is employed, the anhydrous chromic chloride, reducing agent and base can be mixed together, and a limited amount of water added and the reaction caused to take place with the production directly of the basic chromic chloride cake or reaction product. As examples of mixes which may be so employed may be mentioned the following, using sodium carbonate and magnesium oxide respectively as the bases and using aluminum powder as the reducing agent and using anhydrous chromic chloride:

|  | Pounds |
|---|---|
| $CrCl_3$ (100%) | 100 |
| Aluminum powder | 1.3 |
| $Na_2CO_3$ | 35.4 |
| $CrCl_3$ (100%) | 100 |
| Aluminum powder | 1.3 |
| MgO | 13.5 |

The proportions are given in pounds, but these can be varied depending upon the amount of prepared product to be produced. In using these mixtures, an amount of water is added which is so proportioned that it will be entirely or largely combined as water of hydration or of combination in the basic chromic chloride cake produced. When such a limited amount of water is added, a vigorous reaction takes place and a more or less porous product is produced, due apparently to the carbon dioxide set free by the reaction.

Instead of starting with the anhydrous chromic chloride and adding the reducing agent and base to it together with a limited amount of water, it is more advantageous to convert the anhydrous chromic chloride into a soluble form by means of a small amount of reducing agent and a limited amount of water and then to add the base and carry out the remainder of the reaction. In this case, the base reacts with the soluble or dissolved chromium chloride.

Chromic chloride otherwise prepared in a soluble form can also be employed, although I consider the use of the anhydrous chromic chloride and its conversion into a soluble form more advantageous. However, the crystalline chromic chloride containing water of crystallization or hydration can be directly mixed with a base such as sodium carbonate and the mixture heated when a vigorous reaction will take place and a basic chromic chloride will be produced. In this case, the water of hydration of the chromic chloride employed supplies the water of hydration of the basic chromic chloride reaction product. The commercial hydrated chloride, $CrCl_3.6H_2O$ is an extremely hygroscopic material, difficult to make, ship and handle, while the anhydrous chromic chloride is a stable material which can be readily shipped and handled and which can be rendered soluble and then caused to react with the base in a much more advantageous manner.

The amount of water which is present during the reaction which results in the formation of the new basic chromium chloride reaction product can be somewhat varied but in general it will be between 3 and 7 molecules of water of hydration for each molecule of basic chromic chloride ultimately produced, or a similar proportion of water to the anhydrous chromic chloride employed.

When such a limited amount of water is employed, the reaction which takes place is a vigorous one with evolution of considerable heat, and this heat is taken advantage of for carrying out and completing the reaction.

The reaction products or cakes formed with some of the bases are more or less hygroscopic in character. In such cases, the reaction product should be used when freshly prepared, or, if they are stored and shipped and employed some time after they are prepared, they are best protected from absorption of atmospheric moisture by enclosure in sealed containers until such time as they are to be employed in making the tanning baths.

The following example will illustrate the present preferred practice of the invention using anhydrous chromic chloride, metallic aluminum powder as the reducing agent and sodium carbonate as the base. The parts are by weight:

To 100 parts of anhydrous chromic chloride is added 1.3 parts of metallic aluminum powder, this being the amount calculated to give about 5% of aluminum oxide or hydrated oxide on the chromic oxide or hydrated oxide contained in the finished product. A very small portion of water is first added to initiate the reaction and then enough water is added to give from 3 to 7 moles of water of hydration to the basic chromic chloride ultimately produced. When the reaction between the anhydrous chromic chloride, the aluminum and the water has taken place, the temperature of the mass rises to the boiling point, around 100° C. or higher, and a rather thick, soupy solution of chromic chloride is obtained dissolved in its own water of hydration. To this is now added enough soda ash to give a finished product of the desired degree of basicity. For example, by adding enough sodium carbonate to combine with 60% of the chlorine initially present in the chromic chloride, a compound of about 60% basicity would be produced. The basicity may range for example, between 30 and 60%, although this range may be exceeded. After the soda ash is added and thoroughly stirred in, the still semifluid mass is poured into suitable moulds or moulded into suitable form and allowed to set or solidify. After a period of standing, varying from around 3 to 24 hours, a firm, hard cake is obtained which when removed from the mould is sufficiently non-hygroscopic for all practical purposes and readily soluble in cold water.

Other bases can be employed in a similar manner, but soda ash appears to have advantages. Part of the carbon dioxide of the soda ash is set free during the reaction and the product is more or less porous. The degree of porosity can be somewhat regulated by stirring the reaction mixture so as to facilitate the removal of more or less of the carbon dioxide.

The product can be directly produced in the form of bricks or moulded blocks of predetermined weight and content of basic chromic chloride such that these bricks or blocks can be directly added to the tanning bath to give a bath of regulated and predetermined chromium content and tanning properties. Instead of using the product in the form of bricks or blocks, it can be ground or broken up into a powdered or granular or lump form, or it can be extruded and formed into different shapes or particles or pieces of different size.

The product made with the use of sodium carbonate as the base contains some carbonate complexes so that, when the product is added to water, further reaction takes place with evolution of carbon dioxide. The product is in such case an effervescent product, the effervescence of which promotes its solution and its dissemination throughout the tanning bath.

The product made with the use of an added base will also contain the chloride of such base as a salt. When soda ash is employed, the reaction-product will contain neutral salt or sodium chloride resulting from the reaction between the chlorine and the soda ash, and such neutral salt is desirable in the tanning operation.

By regulating the amount of reagents employed and the carrying out of the process, the reaction product in the form of a cake or brick may be made containing a known amount of soluble chromic oxide ($Cr_2O_3$). The individual bricks or blocks can be marked to indicate their weight and their content of chromic oxide so that the consumer can add one or more blocks or bricks of the material without the necessity of weighing the material which he adds to the tanning bath. The brick or block form of the product also lends itself readily to shipment in the least expensive way i. e. in ordinary packages or cartons or in barrels or in bulk.

In employing the new tanning composition, it is merely necessary to add it to the tanning bath in proper amount and to permit it to dissolve, since it is readily soluble in cold water. Products of different degrees of basicity can be employed such that by regulating the proportions of each product or the number of bricks of each product added to the tanning bath, the tanner can regulate the basicity of his product.

The new product has the advantage that it can be directly produced in a solid dry state with only sufficient water to bring about the reaction and to provide the water of combination in the reaction product, thereby avoiding the necessity of evaporating water from the reaction product, and producing the product directly in a merchantable form which is readily soluble in water and can be directly employed by the tanner in making his tanning bath.

The present application is in part a continuation of my prior application, Serial No. 50,137 filed August 13, 1925.

I claim:—

1. A new tanning composition comprising a basic chromic chloride reaction product in the form of a clinker-like or sintered material readily soluble in water.

2. A new tanning composition comprising a basic chromic chloride reaction product in the form of a clinker-like or sintered material readily soluble in water, said composition also containing a chloride salt other than chromium chloride.

3. A new tanning composition comprising a basic chromic chloride reaction product in the form of a clinker-like or sintered material readily soluble in water, said composition also containing sodium chloride and also containing carbonate.

4. A new tanning composition comprising a basic chromic chloride reaction product resulting from the reaction of chromium chloride with a base in the presence of a limited amount of water providing water of hydration in the reaction product, said reaction product being in the form of a clinker-like or sintered material, readily soluble in water and containing the chloride of the base employed.

5. A new tanning composition comprising a basic chromic chloride reaction product resulting from the reaction of chromium chloride and sodium carbonate in the presence of a limited amount of water which is combined as water of hydration in the reaction product, said reaction product being in the form of a sintered or clinker-like material and being cast into blocks and said reaction product also containing sodium chloride and carbonate complexes.

6. The method of producing a tanning composition which comprises causing soluble chromium chloride to react with a base in the presence of a limited amount of water such that a solid basic chromic chloride reaction product will be directly produced.

7. The method of producing a tanning composition which comprises treating anhydrous chromic chloride with a reducing agent and a material which will combine with part of the chlorine of the chromium chloride in the presence of a limited amount of water to produce directly a solid basic chromic chloride reaction product.

8. The method of producing a tanning composition which comprises treating anhydrous chromic chloride, a reducing agent and a base to react in the presence of a limited amount of water to form directly a solid basic chromic chloride reaction product.

9. The method of producing a tanning composition which comprises causing anhydrous chromic chloride to react with a reducing agent in the presence of a limited amount of water to form a solution of chromium chloride and causing the resulting solution to react with an added base, the amount of water present being such that a solid basic chromic chloride reaction product will be directly produced.

10. The method of producing a tanning composition which comprises causing anhydrous chromic chloride to react with a reducing agent in the presence of a limited amount of water to form a solution of chromium chloride, adding to such solution sodium carbonate and causing the same to react therewith, the amount of water present being such that a solid reaction product is directly produced.

In testimony whereof I affix my signature.

FRANK S. LOW.